United States Patent [19]

Kitamura et al.

[11] Patent Number: 5,149,955
[45] Date of Patent: Sep. 22, 1992

[54] FULL CONTACT IMAGE SENSOR DEVICE WITH LIGHT BLOCKING MEANS

[75] Inventors: Koichi Kitamura; Hidenori Mimura; Kazuo Yamamoto; Yasumitsu Ohta; Kazuyoshi Sai, all of Kawasaki, Japan

[73] Assignee: Nippon Steel Corporation, Tokyo, Japan

[21] Appl. No.: 555,594

[22] Filed: Jul. 23, 1990

[30] Foreign Application Priority Data

Jul. 26, 1989 [JP] Japan .................................. 1-193359
Nov. 16, 1989 [JP] Japan .................................. 1-299058

[51] Int. Cl.$^5$ .............................................. H01J 40/14
[52] U.S. Cl. ............................... 250/211 J; 250/208.1
[58] Field of Search ............... 250/208.1, 208.2, 211 J; 357/30 L, 30 D, 30 H, 30 R; 358/213.11

[56] References Cited

U.S. PATENT DOCUMENTS

| | | | |
|---|---|---|---|
| 4,149,197 | 4/1979 | Kos et al. | 358/294 |
| 4,482,804 | 11/1984 | Oritsuki et al. | 250/208.1 |
| 4,555,636 | 11/1985 | Fujisawa et al. | 250/208.1 |
| 4,570,076 | 2/1986 | Hamano et al. | 250/208.1 |
| 4,874,957 | 10/1989 | Sasaki et al. | 357/30 L |
| 4,959,533 | 9/1990 | Tamazaki et al. | 357/30 L |
| 4,977,313 | 12/1990 | Nagata et al. | 250/208.1 |
| 5,004,903 | 4/1991 | Kitamura et al. | 250/211 J |

FOREIGN PATENT DOCUMENTS 59-48954 3/1984 Japan .
59-62267 4/1984 Japan .
59-81968 5/1984 Japan .

Primary Examiner—David C. Nelms
Assistant Examiner—Quet Le
Attorney, Agent, or Firm—Steven M. Rabin

[57] ABSTRACT

A full contact image sensor device comprising sensor elements adapted to macroscopically touch a document to receive reflected light from the document and to generate electric signals in response thereto, wherein a receiving surface of each sensor element has an uneven contour and the device wherein each sensor element corresponding to a pixel comprises a plurality of sensor element blocks is proposed. The devices are easily manufactured and have excellent MTF and sensitivity.

16 Claims, 5 Drawing Sheets

FULL CONTACT IMAGE SENSOR DEVICE WITH LIGHT BLOCKING MEANS

BACKGROUND OF THE INVENTION

1. Field of the Invention

This invention relates to a full contact image sensor device which senses an image of objects without reduction of the image. The full contact image sensor device is utilized for small-sized facsimile terminal equipment, a bar code reader, and the like.

2. Description of the Related Art

Since a contact image sensor device can sense an image of objects without use of an optical system for reduction of the image, the length of an optical path can be shortened so that equipment comprising the contact image sensor device can be miniaturized. For this reason, recently, contact image sensor devices are widely used as an image sensing unit in small sized facsimile terminal equipment, a bar code reader, and the like.

Among various types of conventional contact type image sensor devices, one type of image sensor device uses an optical system without reduction or magnification such as, typically, a SELFOC lens to form an image on the surface of the sensor device. In this type of conventional contact type image sensor device, a clear image is obtained by providing a SELFOC lens on a light receiving surface of sensor elements and by focusing the image of the objects through the SELFOC lens on the sensor elements.

However, the device has defects in that thin type sensors cannot be manufactured due to use of the lens even though a lens having a short focal length is used, and if a lens having too short a focal length is used, the image gets dim due to color aberration. Especially, in a color sensor using the SELFOC lens, a lens having a long focal length must be used, so that the sensor cannot be miniaturized.

For this reason, a type of contact image sensor wherein the SELFOC lens is not used and the sensor elements macroscopically touch the objects to read the image has been developed aiming at lowering the cost of the sensor and miniaturizing the sensor device. This type of contact image sensor device is referred to hereinafter as a full contact image sensor device.

In the full contact image sensor device, a plurality of sensor elements are formed on a lower surface of a transparent plate. A document whose image is sensed is placed under the transparent plate and the sensor elements so that lower surfaces (light receiving surfaces) of the sensor elements come close to the document, and the document is illuminated from above an upper surface of the transparent plate. Light from a light source permeates through the transparent plate, passes through a space between the sensor elements, is irregularly reflected by the document, and reaches the receiving surface of the sensor elements.

If the distance between the document and the sensor elements is too short, the reflected light from the document reaches only the peripheral area of the receiving surface of the sensor elements.

Therefore, the conventional full contact type image sensor device is designed so that the distance between the sensor elements and the distance between the document and the sensor elements are long enough to ensure a sufficient amount of light. To this end, though the sensitivity of the sensor is ensured, reflected light from the document comes not only to the corresponding sensor elements but also to the neighboring sensor elements. This crosstalk degrades the MTF (Modulation Transfer Function) of the image sensor device.

U.S. Pat. No. 4,149,197 and Japanese Unexamined Patent Publication (Kokai) No. 59-48954 disclose a sensor element having a central aperture in order to ensure the sensitivity without degrading the MTF.

In the sensor device disclosed in the aforementioned references, an aperture must be formed in the center of each sensor element. When the aperture bounded by a closed curve is formed in a wet etching process which is usually used, a "puddle" of liquid such as etchant used in the wet etching is created on a pattern bounded by the closed curve, so that it is not easy to form a uniform and clear aperture with good

SUMMARY OF THE INVENTION

It is an object of the present invention to provide a full contact image sensor device which has improved light sensitivity without degrading the MTF thereof and which is easily manufactured. In accordance with the present invention, there is provided a full contact image sensor device comprising light receiving elements adapted to macroscopically touch an object in order to receive reflected light from the object and to generate electric signals in response thereto, wherein a receiving surface of each light receiving element has an uneven contour. In accordance with the present invention there is also provided a full contact image sensor device comprising light receiving elements to macroscopically touch an object in order to receive reflected light from the object and to generate electric signals in response thereto, wherein each light receiving element corresponding to a pixel comprises a plurality of light receiving element blocks.

DESCRIPTION OF THE PREFERRED EMBODIMENTS

Figure 1:
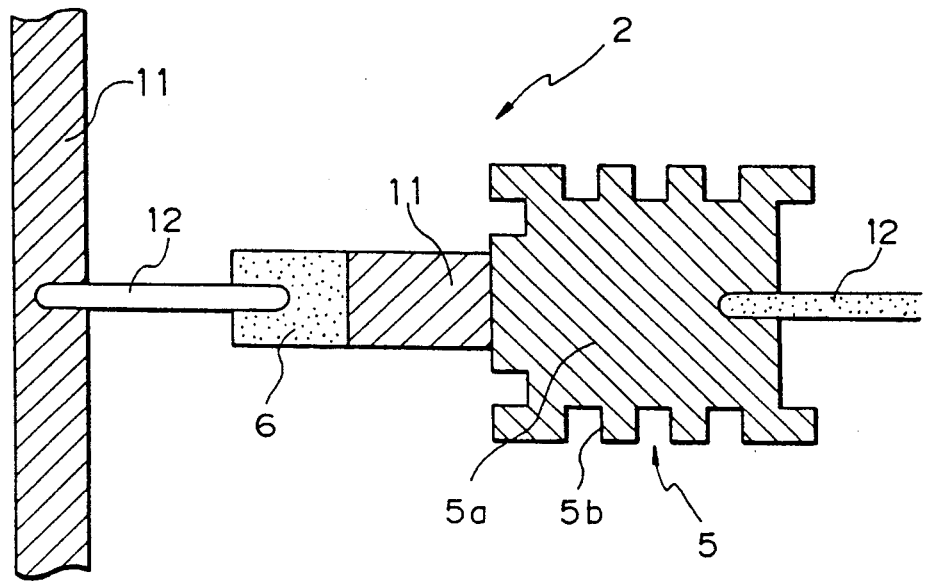
FIG. 1 is a plan view of a sensor element constituting a full contact image sensor according to a first embodiment of the present invention.
Figure 2:
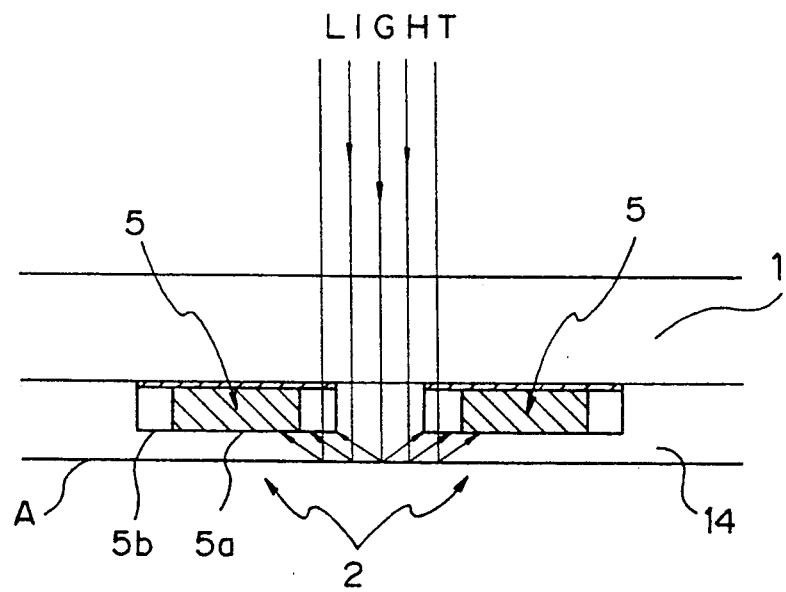
FIG. 2 is a schematic longitudinal fragmentary sectional view of the full contact image sensor device.
Figure 3:
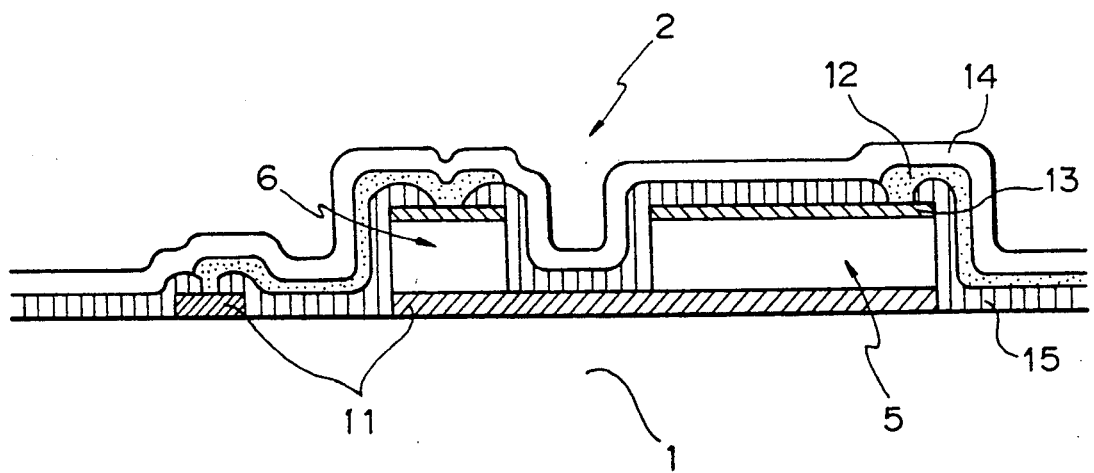
FIG. 3 is a sectional view of the sensor element.

FIG. 1 shows a plan view of a sensor element constituting a full contact image sensor device which is a first embodiment of the present invention. FIG. 2 is a schematic longitudinal fragmentary sectional view of the full contact image sensor device. FIG. 3 is a sectional view of the sensor element.

The full contact image sensor device which is a first embodiment of the present invention comprises a plurality of sensor elements 2 arranged on a glass substrate 1. The sensor element 2 comprises a photodiode 5 and blocking diode 6 both of which have a pin structure using an amorphous silicon. The photodiode 5 serves as a photoelectric transfer element corresponding to a pixel, and the blocking diode 6 serves as a switching element to read out information stored in each photodiode 5. The photodiode 5 and the blocking diode 6 are formed on a common lower electrode 11, and upper electrodes 12 are formed through a transparent conductive membrane 13 on the photodiode 5 and the blocking diode 6.

In the full contact image sensor device which is the first embodiment of the present invention, a peripheral part 5b of a receiving surface 5a of the photodiode 5 is formed in an uneven shape as shown in FIG. 1. The reference numeral 14 denotes a protection membrane made of polyimide resin to protect the sensor elements 2, and 15 denotes an insulation membrane to insulate layers. A so-called back-light system is employed in this full contact image sensor device, namely, a light source (not shown) is arranged at the back of the glass substrate 1, and arrows shown in FIG. 2 denote a light path from the light source. Additionally, integrated circuits, etc. (not shown) for driving the photodiodes 5 of the sensor elements 2 to read out information stored in the photodiode 5 are arranged at the back of the glass substrate 1.

In this construction, incident rays from the light source (not shown) pass between the lower electrodes 11 of neighboring photodiodes 5, and are irregularly reflected by a document A. The reflected light reaches receiving surfaces 5a of the photodiodes 5. Since the document A comes close to the photodiodes 5 in the full contact image sensor device, the reflected light from the document A reaches only the peripheral part 5b of the receiving surface 5a of the photodiode 5. Therefore, as the length of a contour (boundary) of the receiving surface 5a is longer, incident efficiency of the photodiode becomes more improved. Since the boundary defined by the peripheral part 5b of the photodiode 5 according to the present invention is formed in an uneven shape, the length of the contour (boundary) of the receiving surface can be made longer than a conventional rectangular contour, so that more reflected light from the document A reaches the receiving surface 5a of the photodiode 5 than a conventional device.

As a result, in the full contact image sensor device according to the present invention, the photodiode has improved sensitivity. Accordingly, the full contact image sensor device according to the present invention can be miniaturized in comparison with the conventional full contact image sensor device. The inventors carried out an experiment wherein a peripheral part of a photodiode having a size of 100 μm ×100 μm was formed in an uneven shape so that the length of the contour (boundary) became twice as long as with an even shape. As a result of the experiment, output current was improved from a conventional $5 \times 10^{-2}$ A/cm$^2$ to $8 \times 10^{-2}$ A/cm$^2$ on average, using a light source of 1,000 lux.

Though an example having rectangular projections is described in the aforementioned embodiment, the present invention is not restricted thereto, and the peripheral part 5b may be formed having a wavelike (wave) or saw tooth wave shape.

Figure 4:
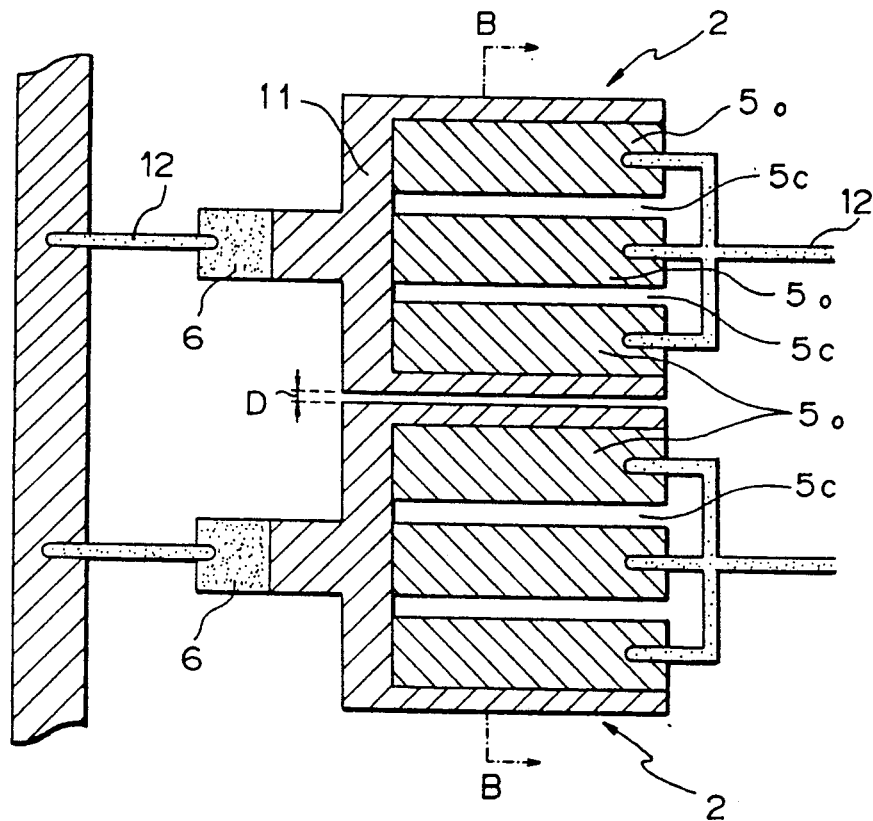
FIG. 4 is a plan view of sensor elements constituting a full contact image sensor device according to a second embodiment of the present invention.
Figure 5:
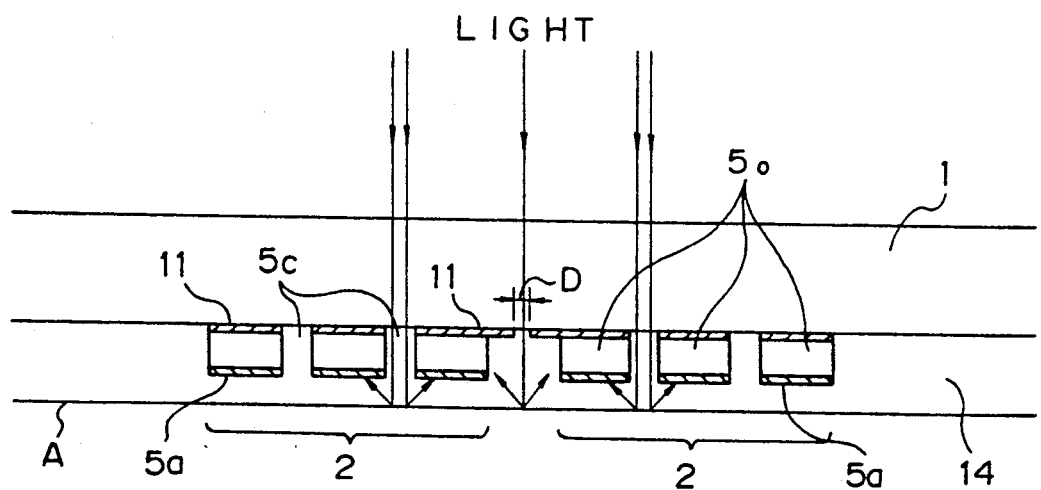
FIG. 5 is a schematic fragmentary sectional view taken along a line B—B of the full contact image sensor device shown in FIG. 4.
Figure 6:
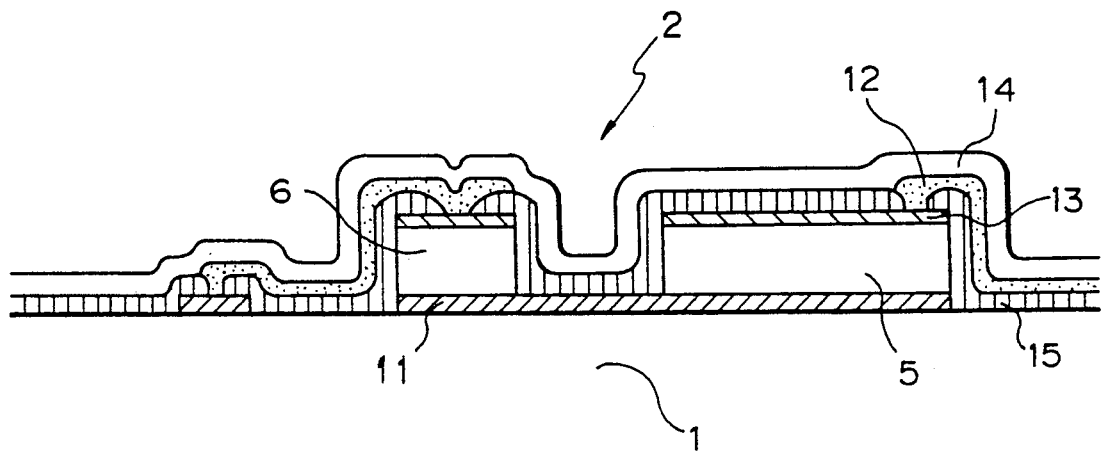
FIG. 6 is a sectional view of the sensor element.

FIG. 4 shows a plan view of sensor elements constituting a full contact image sensor device which is a second embodiment of the present invention, FIG. 5 shows a schematic fragmentary sectional view in B—B of the full contact image sensor device shown in FIG. 4, and FIG. 6 shows a sectional view of the sensor element.

The full contact image sensor device which is a second embodiment of the present invention also comprises a plurality of sensor elements 2 arranged on a glass substrate 1. The sensor element 2 comprises a photodiode 5 and blocking diode 6 both of which have a pin structure using an amorphous silicon. The photodiode 5 serves as a photoelectric transfer element corresponding to a pixel, and the blocking diode 6 serves as a switching element to read out information stored in each photodiode 5. The photodiode 5 and the blocking diode 6 are formed on a common lower electrode 11, and upper electrodes 12 are formed through a transparent conductive membrane 13 on the photodiode 5 and the blocking diode 6.

In the full contact image-sensor device which is the second embodiment of the present invention, each photodiode 5 is divided into a plurality of juxtaposed photodiode blocks 5o between which apertures 5c are formed, as shown in FIG. 4. The distance D between neighboring sensor elements 2 can be made as narrow as insulation can be formed between them. For example, in this example, D is 5 μm. The reference numeral 14 denotes a protection membrane made of polyimide resin to protect the sensor element 2 and 15 denotes an insulation membrane to insulate layers. A so-called back-light system is employed in this full contact image sensor device, namely, a light source (not shown) is arranged at the back of the glass substrate 1, and arrows shown in FIG. 5 denote a light path from the light source. Additionally, integrated circuits, etc. (not shown) for driving the photodiodes 5 of the sensor elements 2 to read out information stored in the photodiode 5 are arranged at the back of the glass substrate 1.

In this construction, incident rays from the light source (not shown) pass between the lower electrode 11 of neighboring photodiodes 5, and are irregularly reflected by a document A. Almost all of the reflected light reaches receiving surfaces 5a of the photodiodes 5.

Since the photodiode 5 is divided into a plurality of diode blocks 5o in this embodiment of the present invention so that incident rays from the light source pass between not only the lower electrodes 11 but also through the aperture 5c of each photodiode 5, so the quantity of light reflected by the document A and reaching the receiving surface 5a of the photodiode 5 becomes larger than in the conventional device. Accordingly, in accordance with the second embodiment of the present invention, the light sensitivity of the photodiode 5 is much greater than that of the conventional one, even if the size of the photodiode is equal to that of the conventional one.

Additionally, in accordance with the second embodiment of the present invention, since incident rays from the light source also pass through the aperture 5c of the photodiode 5 to reach the document A, the distance D between the sensor elements 2 can be made as narrow as insulation can be formed between them. For this reason, the MTF is improved in comparison with the conventional full contact image sensor device.

Additionally, as shown in FIGS. 4 and 5, by forming the lower electrodes 11 so that portions of the lower electrodes 11 close to the neighboring sensor element extend over (beyond) the photodiode 5, and the amount of light which passes between the neighboring sensor elements is reflected by the document and reaches the receiving surface 5a of the photodiode 5 can be made relatively small. In this way, the MTF is further improved. In the inventors' experiment, 80% of MTF was attained when a document having 4 lp/mm of linear density was read using a sensor having 8 pixels/mm of element density. In the conventional device, the MTF was 30%. Sensitivity was improved from 2.0 V/lx·sec to 3.0 V/lx·sec.

In accordance with the second embodiment of the present invention, the shape of each of the divided photodiode blocks 5o may be simple, for example, a rectangular shape, and though the photodiode 5 has an aperture 5c, the aperture 5c is not closed but necessarily extends outward, so that the photodiode 5 according to the second embodiment of the present invention can be formed uniformly and with high yield. Therefore, the full contact image sensor device can be manufactured at low cost.

Though the second embodiment of the present invention is described using the aforementioned example wherein each photodiode is divided into three blocks, the present invention is not restricted to this example. For example, the photodiode 5 may be divided into two or more than four blocks. If the photodiode 5 is divided into more than four blocks, the length of the contour of the receiving surface of a photodiode becomes longer so that the sensitivity is more improved.

Figure 7:
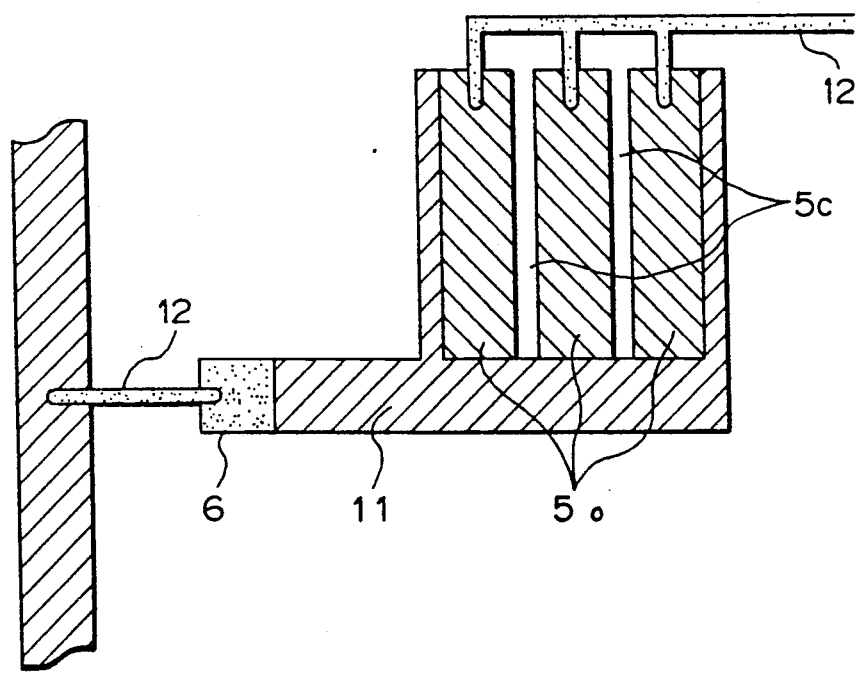
FIG. 7 is a plan view of a first modification of the full contact image sensor device according to the second embodiment of the present invention.
Figure 8:
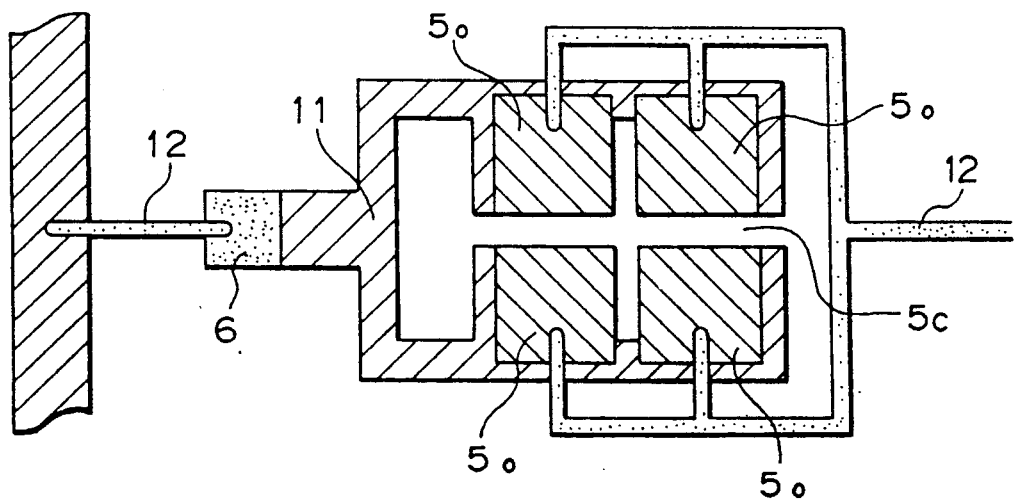
FIG. 8 is a plan view of a second modification of the full contact image sensor device according to the second embodiment of the present invention.

Though the second embodiment of the present invention is described referring to the example wherein the photodiode 5 is divided by horizontal lines in FIG. 4, the photodiode 5 may be divided by vertical lines as shown in FIG. 7, or by a horizontal line and a vertical line, as shown in FIG. 8.

Additionally, though the aforementioned first and second embodiments of the present invention are described in the case where the light receiving element is a photodiode, the light receiving element may be a phototransistor or the like.

We claim:

1. A full contact image sensor device comprising
a plurality of juxtaposed light receiving elements arranged to macroscopically touch an object in order to receive light reflected from the object and to generate electric signals in response thereto, the light receiving elements having first spaces therebetween, each light receiving element corresponding to a pixel and comprising a plurality of light receiving element blocks; and
means for blocking a penetration of light through said first spaces.

2. A full contact image sensor device as claimed in claim 1, wherein the light receiving elements include photodiodes each accompanied by a blocking diode and comprising a plurality of photodiode blocks.

3. A full contact image sensor device as claimed in claim 2, wherein the photodiode blocks are formed by dividing the photodiode along planes substantially parallel with a direction from the blocking diode to the photodiode.

4. A full contact image sensor device as claimed in claim 2, wherein the photodiode blocks are formed by dividing the photodiode along planes substantially perpendicular to a direction from the blocking diode to the photodiode.

5. A full contact image sensor device as claimed in claim 2, wherein the photodiode blocks are formed by dividing the photodiode along planes substantially parallel with a direction from the blocking diode to the photodiode and a line substantially perpendicular to that direction.

6. A full contact image sensor device as claimed in claim 2, wherein the device comprises lower electrodes arranged on the respective photodiodes, portions of the lower electrodes extending over said first spaces, said means for blocking including said portions.

7. A full contact image sensor device as claimed in claim 1, wherein the light receiving elements are phototransistors.

8. A full contact sensor device as claimed in claim 1, wherein the blocks of each element are separated from each other by second spaces, the second spaces providing a means for conducting light through the element to the object.

9. An image sensor device for sensing light reflected from an object, comprising:
a substrate having a light penetrable part for passing light therethrough from a light source to the object; and
a plurality of juxtaposed light receiving elements having first spaces therebetween and being formed on said substrate, each element to be disposed between said substrate and the object for receiving a reflection of the light from the object, each element corresponding to a pixel and including a plurality of light receiving element blocks; and
means for blocking the light from penetrating said first spaces.

10. An image sensor device as claimed in claim 9, wherein said light receiving elements include photodiodes each accompanied by a corresponding blocking diode, each element block comprising a photodiode block.

11. An image sensor device as claimed in claim 10, wherein said photodiodes are separated from the accompanying blocking diode in a given direction and are divided into the photodiode blocks along planes which are parallel to the given direction.

12. An image sensor device as claimed in claim 10, wherein said photodiodes are separated from the accompanying blocking diodes in a given direction and are divided into the photodiode blocks along planes which are perpendicular to the given direction.

13. An image sensor device as claimed in claim 10, wherein said photodiodes are separated from the accompanying blocking diode in a given direction and are divided into the photodiode blocks along planes which are parallel to the given direction and planes which are perpendicular to the given direction.

14. An image sensor device as claimed in claim 10, further comprising lower electrodes disposed on said photodiodes, portions of said lower electrodes extending over said first spaces, said means for blocking light including said portions.

15. An image sensor device as claimed in claim 9, wherein said light receiving elements include phototransistors.

16. An image sensor device as claimed in claim 9, wherein each element has at least one space separating the blocks thereof from each other so that the light passing through the light penetrable part passes through the second spaces to the object.

* * * * *